March 17, 1970  H. J. CAULFIELD  3,501,219
COLOR CONTROL FOR DYNAMIC DISPLAYS
Filed Sept. 8, 1966

INVENTOR
HENRY JOHN CAULFIELD
ATTORNEY

United States Patent Office 3,501,219
Patented Mar. 17, 1970

3,501,219
COLOR CONTROL FOR DYNAMIC DISPLAYS
Henry John Caulfield, Richardson, Tex., assignor to Texas Instruments Incorporated, Dallas, Tex.
Filed Sept. 8, 1966, Ser. No. 577,956
Int. Cl. G02f 1/26
U.S. Cl. 350—150
2 Claims

ABSTRACT OF THE DISCLOSURE

Disclosed is a system for changing a black and white image to a color image in which the light from the black and white image is directed through a first polarizer, an electro-optic body having a time-varying voltage applied to it to change the elliptical polarization of the light passing through it in accordance with the desired color to be obtained, a quarter-wave plate, an optically active body to rotate the plane of polarization an amount depending upon the elliptical polarization effected by the electro-optic body, and a second polarizing sheet having its axis of polarization at an angle of 90° with respect to the angle of polarization of the first polarizing sheet, such that an observer will see a color representation of the black and white image at the output of the second polarizing sheet.

---

This invention relates to color reproduction systems and methods, and more particularly to a system and method adapted to produce color images through a passive element employed in conjunction with means for controlling transmission and polarization of light from a white light source.

In producing dynamic displays, it is desirable that the use of moving elements be avoided if rapid response to changes in the display are to be achieved. One color modulator employing a moving element is described and claimed in U.S. Patent No. 3,131,253 to Zandman et al. In that system, a forced birefringent material is interposed between a black and white image and a viewer. In contrast with such systems, the present invention involves the use of a passive element which causes predominantly only one wave length to pass through an optical system gated to control the polarization state of the white light. More particularly, a first and second polarizer are employed. One polarizer receives light from an image and is oriented with its plane of polarization at a predetermined angle with respect to the second polarizer. Both polarizers are interposed in the paths of light forming the image. An electro-optic body having X and Y axes oriented at 45° with respect to the plane of polarization of said first polarizer controls the polarization state of the light transmitted by said first polarizer by introducing a phase difference between two components of the incident plane polarized light resulting in elliptically polarized light. A passive element is located between the electro-optic body and the second polarizer for changing the direction of polarization of light passing from the electro-optic body thereby to control the wave length of light which passes through the second polarizer. Means are provided for applying a time dependent control voltage to the electro-optic body to vary the polarization state of light passing through the elecro-optic body as a function of time.

For a more complete understanding of the present invention and for further objects and advantages thereof, reference may now be had to the following description taken in conjunction with the accompanying drawings in which.

The problem to which the present invention is directed is to convert a black and white dynamic display to full natural color display without modification of the system employed to form the black and white display.

Figure 1:
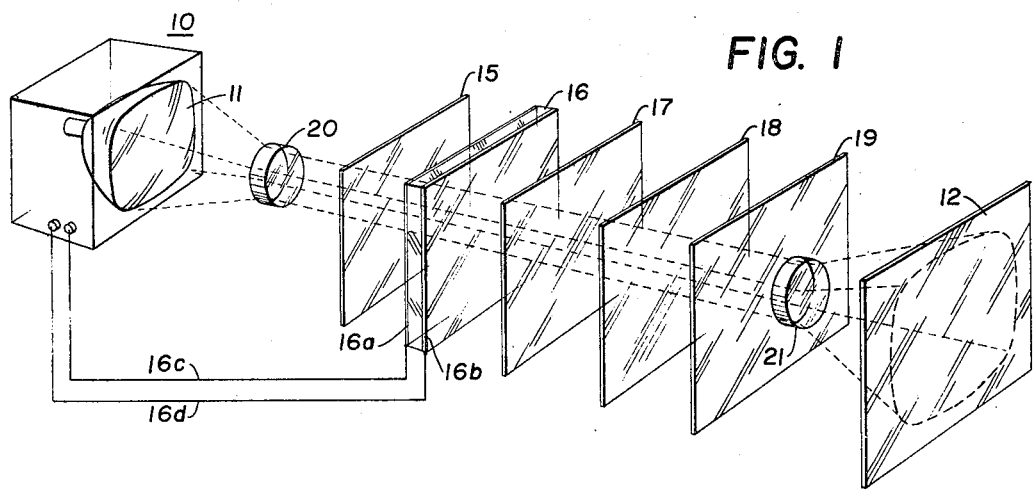
FIGURE 1 is a diagrammatic view of a system embodying the present invention as applied to a direct viewing television system.

In accordance with the embodiment shown in FIGURE 1, the invention is illustrated as applied to a television display. It is to be understood that it is applicable generally to all black and white displays. A conventional television receiver 10 receives video signals at its input in accordance with conventional techniques. A screen 11 as on a cathode ray tube is provided for presentation and display of a black and white image which is normally produced by the rapid scanning of a white light spot along a set of spaced horizontal lines on the screen.

In accordance with the present invention, there is interposed between the face of the cathode ray tube 11 and an observer a system which causes the black and white image to appear as a color image corresponding in configuration with the black and white image.

In accordance with the present invention, the light from the face of the tube 11 passes through a first polarizer 15 and thence through an electro-optic body 16. The electro-optic device 16 is a light transmitting body which has different indices of refraction along two different axes X and Y when a voltage is applied thereto. In the present case, the X and Y axes of the electro-optic body 16 are oriented at an angle of 45° with respect to the plane of polarization of light passing through the polarizer 15. Next, the light passes through a quarter wave plate 17 to change the elliptically polarized light from the body 16 into plane polarized light. Light passing through the quarter wave plate 17 then passes through an optically active body 18. The optically active body 18 rotates the plane of polarization of the plane polarized light from the quarter wave plate 17. Finally, the light passes through an analyzer which is a polarizing sheet 19. The light may then be projected onto screen 12.

In the embodiment shown in FIGURE 1, a pair of lenses 20 and 21 are included in the system so that the elements 15–19 can be of relatively small area. Where large plates are employed, as will be described, the lenses 20 and 21 and the screen 12 will be eliminated.

The white light from the face of the screen 11 is thus polarized by the polarizer 15. Because the direction of polarization of light from the polarizer 15 is at an angle of 45° with respect to the electro-optic device 16, the latter device splits the light into two components and, because of the difference in the index of refraction along the two axes, causes a phase shift between the two components, thus causing the output therefrom to be elliptically polarized. The elliptically polarized light then becomes linearly polarized by reason of the action of the quarter wave plate 17. Since the light from screen 11 is white light, the plate 17 is quarter wave only for light at the center of the desired spectrum.

The electro-optic body 16 is provided with a pair of electrodes on opposite faces thereof. The electrodes may be formed by deposit of thin films of tin oxide to which the conductors 16a and 16b are connected. Thus, the degree of rotation of the polarized light may be controlled by the voltage applied to conductors 16a and 16b. The optically active body 18 then serves to rotate the polarized light received from quarter wave plate 17 an additional angle.

Since the light is from a white light source, the different color components thereof will be rotated through different angles by the electro-optic body 16 and the optically active body 18, so that a particular color of light will appear on the screen 12, the color depending upon the angle of rotation of the analyzer 19 and the voltage applied to the electro-optic body 16.

In practice, the polarizer 15 and the analyzer 19 can be initially oriented at 90° with respect to each other. The voltage may then be adjusted on the electro-optic body 16 such that a given portion of the image on the screen 16 which should be of a given color will in fact appear as that color on the screen 12.

In practice, the electro-optic body 16 may be of potassium dihydrogen phosphate (KDP), potassium tantalum niobate (KTN), an electro-optic glass of sodium niobate ($NaNbO_3$) described by N. F. Barrelli et al. in Applied Physics Letters, vol. 7, page 117 (1965), barium titanite ($BaTiO_3$) or other such materials. The optically active material 18 may be of the optically active quartz or other micro crystalline materials of optically active character such as sodium chlorate as solids and sucrose or any one of several chlosteric liquid crystals such as are well known and are described by Fergason in Scientific American, vol. 211, 1964, page 76.

It will be understood that the voltage applied to the electro-optic body 16 will be synchronized with the sweep of the beam across the face of tube 11 and will be synchronized with and dependent upon the variations in color desired in the ultimate image to be produced. The development of such synchronized signals is well known in the art and will not be described in detail. This relationship is merely indicated by the connections leading from the electro-optic body 16 by way of conductors 16a and 16b to the receiver 10 and may be generally as described in Patent No. 3,131,253 to Zandman et al.

Figure 2:
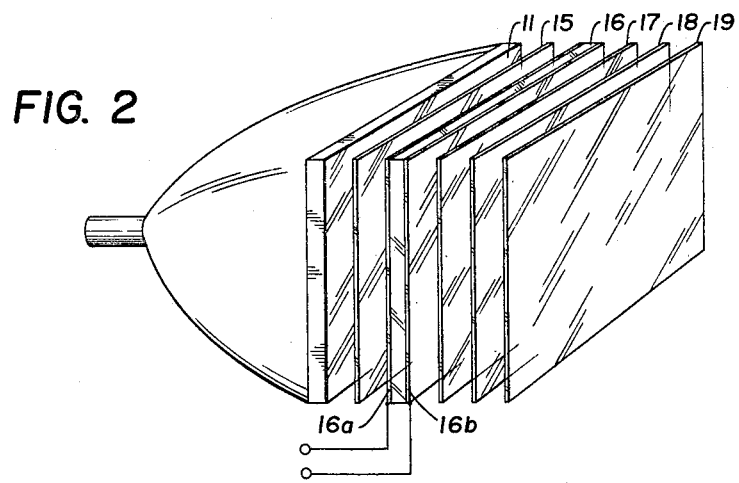
FIGURE 2 is a modification of the system of FIGURE 1.

In FIGURE 2, a system has been illustrated wherein the lenses 20 and 21 and the screen 12 have been eliminated and wherein the color selector system is formed of a sandwich of planar sheets which may in general be the same size as and conform with the configuration of the face of the black and white image-forming device. In this embodiment, the screen 11 is positioned adjacent to the polarizer 15 with the electro-optic body 16, the quarter wave plate 17, the optically active material 18, and the analyzer 19 successively stacked thereon. Thus, in this embodiment, the color image is produced in synchronism with and is dependent upon the black and white image on the screen 11. The color image is received through the analyzer 19. This embodiment is preferred where sheet materials of requisite size are available.

Figure 3:
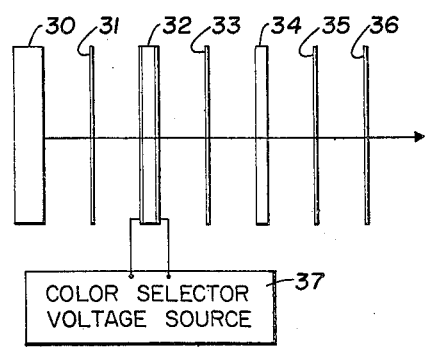
FIGURE 3 illustrates a further modification of the invention employing a birefringent material.

In FIGURE 3, a modification of the color selector has been illustrated wherein a birefringent material is employed with the electro-optic body. Light from the source 30 passes successively through a polarizer 31, an electro-optic body 32, a quarter wave plate 33, and a birefringent sheet 34, following which it passes through a second quarter wave plate 35 and thence an analyzer 36. The polarizer 31 and analyzer 36 are polarizing sheets oriented at an angle one with respect to the other. The body 32 is a sheet of electro-optic glass with transparent electrodes on opposite faces thereof to which a color selector voltage is applied from a source 37 as above described.

As in FIGURES 1 and 2, polarized white light which passes through the electro-optic body 32 has two components differently shifted in phase. As a result, the emerging light is elliptically polarized with eccentricity which depends upon the voltage applied to body 32 and upon the frequency of the light.

The quarter wave plate 33 (quarter wave at the center of the spectrum of interest) converts the elliptically polarized light to plane polarized light at an angle dependent upon the eccentricity of the elliptically polarized light.

The birefringent plate 34 introduces additional phase shifts which are frequency-dependent; that is, the various wave lengths are acted upon in different degrees and emerging from the birefringent plate are elliptically polarized. The quarter wave plate 35 again converts the elliptically polarized light to plane polarized light. In general, there will be a plane of polarization for one frequency aligned with the high transmission polarization direction of the analyzer 36. The analyzer 36, polarizer 31 or the voltage on the body 32 may then be adjusted such that desired color from source 30 will appear when viewed through the modulator 31–36.

It will be appreciated that the color modulation can be carried out though with some degradation of performance upon the elimination of one or both of the quarter wave plates 33 and 35. The birefringent body 34 may be a sheet of Scotch tape or other known material having the birefringent character.

What is claimed is:

1. In a system where a black and white image is to be transformed into a color representation thereof, the combination which comprises:
    (a) a first and second polarizer, one of which receives light from said image and is oriented with its plane of polarization at a predetermined angle with respect to the second polarizer and both of which are interposed in the paths of light forming said image,
    (b) an electro-optic body having X and Y axes oriented at 45° with respect to the plane of polarization of said first polarizer to control the polarization state of the light transmitted by said first polarizer,
    (c) a quarter wave plate between said electro-optic body and said second polarizer to convert elliptically polarized light from said body to plane polarized light,
    (a) a passive element located between said quarter wave plate and said second polarizer for changing the direction of polarization of light passing from said quarter wave plate, and
    (e) means for applying a time dependent control voltage to said electro-optic body to vary said polarization state as a function of time.

2. In a system where a black and white image is to be transformed into a color representation thereof, the combination which comprises:
    (a) a first and second polarizer, one of which receives light from said image and is oriented with its plane of polarization at a predetermined angle with respect to the second polarizer and both of which are interposed in the paths of light forming said image,
    (b) an electro-optic body having X and Y axes oriented at 45° with respect to the plane of polarization of said first polarizer to control the polarization state of the light transmitted by said first polarizer,
    (c) a quarter wave plate between said electro-optic body and said second polarizer to convert elliptically polarized light from said body to plane polarized light,
    (d) an optically active material located between said quarter wave plate and said second polarizer for changing the direction of polarization of light passing from said quarter wave plate, and
    (e) means for applying a time dependent control voltage to said electro-optic body to vary said polarization state as a function of time.

References Cited

UNITED STATES PATENTS

| | | | |
|---|---|---|---|
| 2,002,515 | 5/1935 | Worrall | 350—150 X |
| 2,638,816 | 5/1953 | Stolzer | 350—150 |
| 3,375,052 | 3/1968 | Kosanke et al. | 350—150 |

DAVID SCHONBERG, Primary Examiner

P. R. MILLER, Assistant Examiner

U.S. Cl. X.R.

350—157, 158